United States Patent [19]

Saji

[11] Patent Number: 5,074,589
[45] Date of Patent: Dec. 24, 1991

[54] AUTOMATIC SEAT BELT

[76] Inventor: Masaharu Saji, 687, Kamimigusa, Yashiro-cho, Kato-gun, Hyogo Pref., Japan

[21] Appl. No.: 570,661

[22] Filed: Aug. 21, 1990

[30] Foreign Application Priority Data

Aug. 28, 1989 [JP] Japan .................................. 1-218712

[51] Int. Cl.⁵ .......................................... B60R 22/06
[52] U.S. Cl. .................................. 280/804; 280/803
[58] Field of Search .............. 280/801, 802, 803, 804, 280/808

[56] References Cited

U.S. PATENT DOCUMENTS

| | | | |
|---|---|---|---|
| 3,680,883 | 8/1972 | Keppel et al. | 280/803 |
| 3,743,319 | 7/1973 | Winchell | 280/803 |
| 4,213,637 | 7/1980 | Mauron | 280/803 |
| 4,536,010 | 8/1985 | Matsunami et al. | 280/802 |
| 4,542,919 | 9/1985 | Else | 280/804 |
| 4,589,680 | 5/1986 | Gürtler et al. | 280/801 |
| 4,597,587 | 7/1986 | Yoshitsugu et al. | 280/803 |
| 4,741,555 | 5/1988 | Frantom et al. | 280/804 |

*Primary Examiner*—Kenneth R. Rice
*Attorney, Agent, or Firm*—Armstrong, Nikaido, Marmelstein, Kubovcik & Murray

[57] ABSTRACT

Lap seat belt and shoulder seat belt are automatically set to restrain a seated person. A first end of each belt is slidable in a guide rail diagonally disposed on the inner surface of the door. Second ends of the belts are fixed on the inner side of the bottom seat and on the inner portion of the seat back respectively. When the first ends of the seat belts are in the highest position of the guide rail, the seated person is in a free state. When the first ends are slided and set in the lowest position, the seat belts restrain the person.

2 Claims, 3 Drawing Sheets

AUTOMATIC SEAT BELT

BACKGROUND OF THE INVENTION

1. Field of the Invention

This invention relates to a seat belt provided for a seat in an automobile except a bus, for example, a passenger car and a truck, and capable of being put on by a seated person automatically.

2. Description of the Prior Art

It is a legal duty in Japan for a person sitting on a front seat in an automobile to wear a seat belt.

However, the manual operation of the person to draw a tongue plate to himself and anchor the same to an anchor buckle for the purpose of wearing a seat belt are troublesome, and he is apt to fail to wear it. Therefore, it has been desired to develop an automatic seat belt capable of being put on by a person automatically.

A conventional seat belt is so designed that the shoulder belt can be easily drawn out from a retractor provided above the shoulder of a person. However, the fastening of the tongue plate to an anchor buckle must also be done manually.

Another type of seat belts has been proposed in which a buckle with which a tongue plate is engaged is slidably provided in a guide rail fixed on a window frame above a door of the automobile, the seat belt whose one end is attached to the tongue plate is moved toward a rear upper position, and the shoulder of the person is automatically restrained thereby. However, this structure is only for the shoulder belts, and a lap belt for fixing the waist of the person is still handled manually.

SUMMARY OF THE INVENTION

The present invention relates to a semiautomatic seat belt whose tongue plate is engaged easily with an anchor buckle.

It is an object of the present invention to propose a completely automatic seat belt for which all operations including an operation of engaging a tongue plate with an anchor buckle need not be manually carried out.

Another object of the present invention is to automate not only a shoulder belt but also a lap belt.

Still another object of the present invention is to improve a conventional automatic seat belts which is connected to the upper portion of a door window frame, and is, therefore, an eyesore.

To achieve those objects, the present invention provides a semiautomatic seat belt in which, two seat belts are attached to a tongue plate, one of said two seat belts is wound in a belt retractor provided at the rear lower portion of a bottom seat on the inner side, said belt being used as a lap seat belt, the other of said seat belts is wound in another belt retractor provided at the rear lower portion of a seat back via the upper inner portion of said seat back, the latter belt being used as a shoulder belt, said tongue plate is engaged with a guide buckle provided slidably in a guide rail, said guide rail is so attached to the inner surface of a door diagonally that the front end of said guide rail may be higher than the rear end, said guide buckle is retained in the highest position of said guide rail when a person get into or out of the automobile so as to make the person free, and said guide buckle is slided to the lowest position of said rail so as to restrain the person when said automobile is started.

The automatic seat belt according to the present invention comprises the above members, wherein the shoulder and lap belts are drawn from two portions, i.e., from the rear lower portion of the inner side, opposite to the door, of the seat, and from the upper portion of the inner side, also opposite to the door, of the seat back, and a portion on the door, to which the ends of the belts are attached, is slided, and the lap and shoulder belts restrains the person automatically.

The seat belt is hooked on a door in advance, and an anchor buckle is provided at the lower portion of the door. The level of the portion of the seat belt which is connected to the door becomes lower than conventional automatic seat belts. Therefore, the seat belt according to the present invention does not become an eyesore.

The above and other objects as well as advantageous features of the invention will become apparent from the following description of the preferred embodiment taken in conjunction with the accompanying drawings.

DETAILED DESCRIPTION OF THE PREFERRED EMBODIMENT

Figure 1:
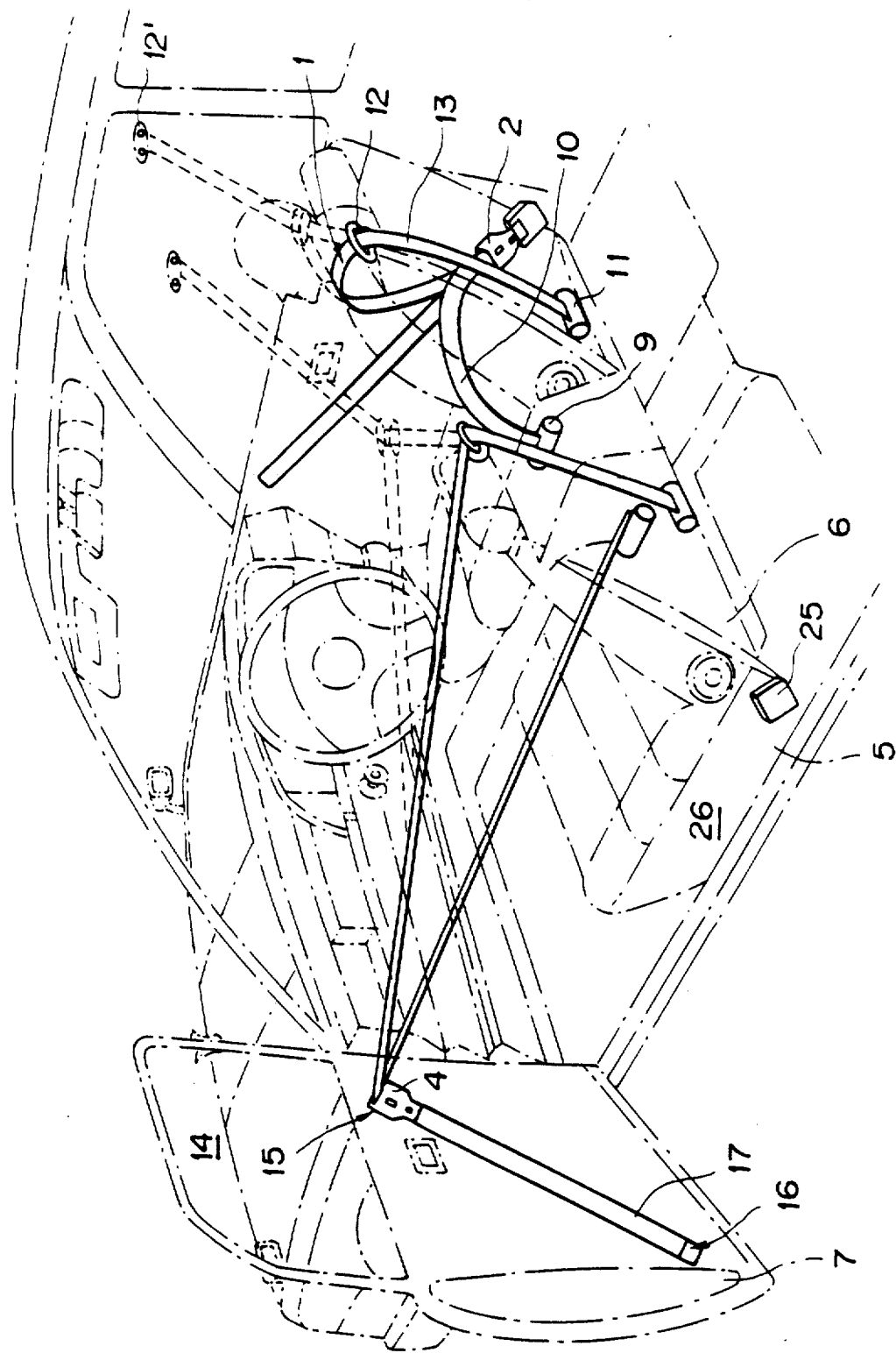
FIG. 1 is a schematic perspective view of an embodiment of the automatic seat belt according to the present invention, with the part of the body of an automobile which corresponds to the front seats cut away.

Referring to the front seats in the automobile of FIG. 1, a seat belt of the left-hand seat is in free state, and another seat belt of the right-hand seat is in a restraint state.

Figure 3:
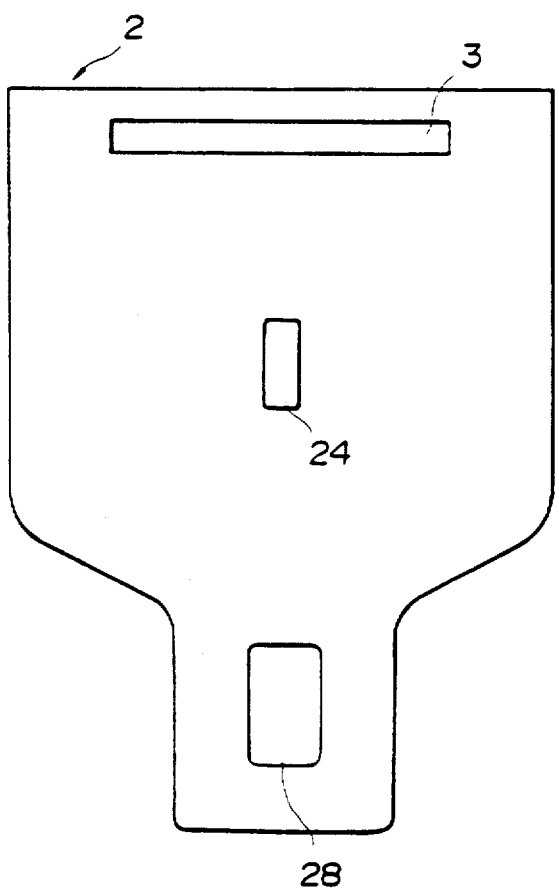
FIG. 3 is a plan view of a tongue plate of the embodiment.

A seat belt 1 is passed through and held firmly in a slot 3 provided at the upper end portion of a tongue plate 2 shown in FIG. 3, and it is sewn 4 by a sewing machine so that both sides of the seat belt are lifted. A reference numeral 5 denotes a seat on which a person sits, 6 a seat back, 7 a door, and 8 an inner part of an automobile with respect to the lengthwise center line thereof.

In the case of the right-hand seat, a belt retractor 9 in which one of the seat belts 1 is wound is provided at the rear lower portion, which is on the side of the inner part 8 of the automobile, of the seat 5, and one the seat belts 1 extending between the belt retractor 9 and tongue plate 2 forms a lap belt 10 used to restrain the waist of a driver. Another belt retractor 11 is provided at the rear lower portion, which is on the side of the inner part 8, of the back 6, and the other of the seat belts 1 which extends between this belt retractor 11 and tongue plate 2 through a guide roll 12 attached to the upper portion, which is on the side of the inner part 8, of the back 6 forms a shoulder belt 13 used to restrain the back of the passenger. Instead of the guide roll 12, a ring 12' suspended from the ceiling may be used.

Figure 5:
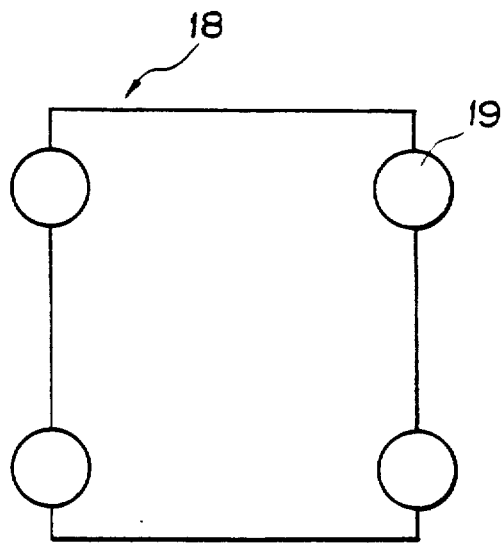
FIG. 5 is a rear elevation of a slide motor.

Regarding the left-hand seat, a slanting guide rail 17 is provided on the inner surface of the door 7 so that the guide rail 17 extends between the front highest position 15 and the rear lowest position 16, both positions 15 and 16 being below a window glass 14. The wheels 19 of a slide motor 18 shown in FIG. 5 are fitted slidably in this guide rail 17. The slide motor 18 is a miniaturized motor, and is turned on by remote control using ultrasonic waves, and turned off at the highest and lowest positions 15, 16 by limit switches.

Figure 2:
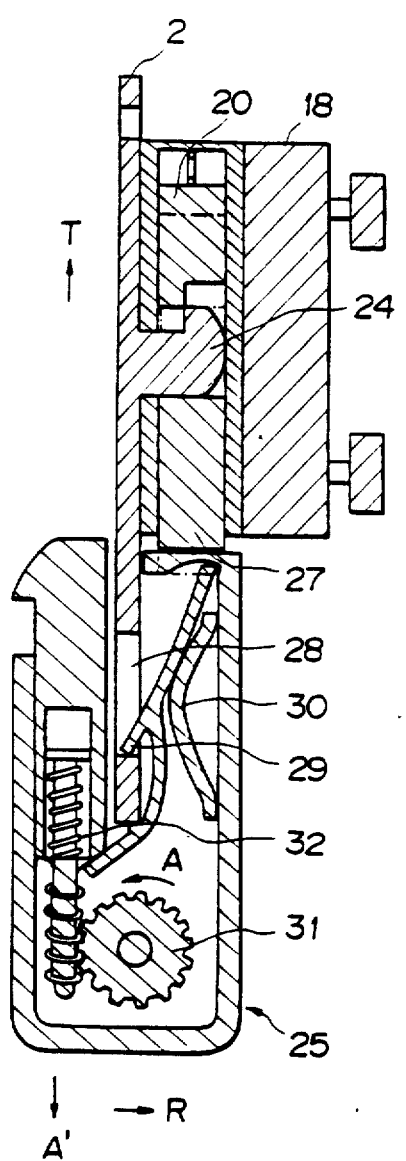
FIG. 2 is a longitudinal section of an anchor buckle of the embodiment and parts associated with the same.
Figure 4:
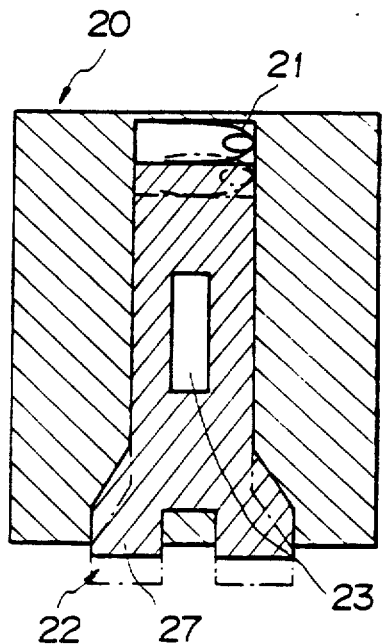
FIG. 4 is a longitudinal section of a guide buckle of the embodiment.

A guide buckle 20 shown in FIG. 4 is integrated with the sliding motor 18. A slide plate 22 biased by a spring 21 is fitted slidably in the guide buckle 20, and a bore 23 is provided in the slide plate 22. A hook portion 24 of the tongue plate 2 of FIG. 2 is engageable with this bore 23. Referring to FIG. 2, the hook portion 24 is out of engagement with the bore 23. The hook portion 24 engages the bore 23 when the tongue plate 2 is moved up toward an upper portion T. Accordingly, the guide buckle 20 is moved from the higher position 15 to the lower position 16 so as to keep the person in a restraint state, owing to a sliding movement of the slide motor 18 in the guide rail 17, with the hook portion 24 of the tongue plate 2 engaged with the bore 23 in the guide buckle 20 attached integrally to the slide motor 18.

Figure 6:
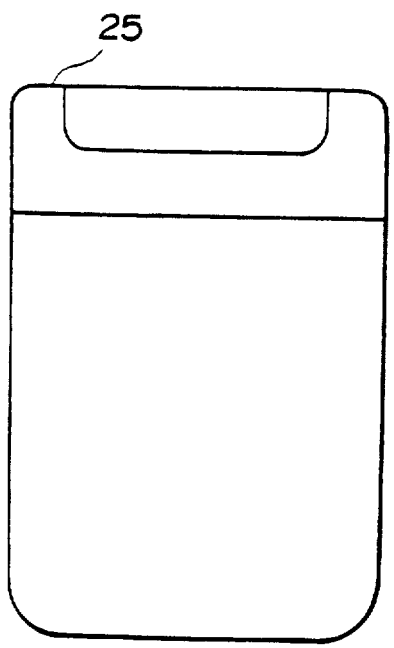
FIG. 6 is a plan view of the anchor buckle.

When the guide buckle 19 reaches the lower position 16 at the lowest end of the guide rail 17, it faces an anchor buckle 25 shown in FIG. 6, which is provided on the rear lower portion on the outer side 26, i.e. on the side of the door, of the seat 5 as shown in FIG. 1, this portion of the seat 5 being aligned with and on an extension of the lowest position 16 of the guide rail 17.

The slide plate 22 in the guide buckle 20 shown in FIG. 4 has a knob 27 projecting from the lower end portion thereof. When this knob 27 collides with the anchor buckle 25 as shown in FIG. 2, the bore 23 is lifted against the force of the spring 21 to cause the hook portion 24 of the tongue plate 2 to be disengaged from the bore 23. A moment before the hook portion 24 disengages from the bore 23, a bore 28 provided in the lower portion of the tongue plate 2 as shown in FIG. 3 engages a claw 29 shown in FIG. 2 of the anchor buckle 25. Since this claw 29 is pressed by a spring 30, it holds the edge portion of the bore 28 reliably. When a gear 31 connected to the shaft of a motor (not shown) is turned in the direction indicated by arrow A, a bar 32 provided with a helical groove is lowered in the direction indicated by arrow A', so that the claw 29 is pressed down in the direction indicated by arrow R in FIG. 2 against the spring 30. Therefore, the claw 29 disengages from the bore 28, and the tongue plate 2 is drawn upward in the direction T to cause the hook portion 24 to engage the bore 23 again.

When a person gets into and out of an automobile, the tongue plate 2 is kept in the higher position 15 to put the person in a free state. In order to put the person in a restraint state automatically, a button switch (not shown) provided inside the automobile is pressed to turn on the slide motor 18, slide the tongue plate 2 together with the guide buckle 20 to the lower position 16 and keep the person in the restraint state. During this time, the tongue plate 2 is transferred from the door 7 to the anchor buckle 25 provided on the outer side of the seat 15 in order that even if the door is opened due to an accident such as a collision, the person can be restrained on the seat reliably.

The above is only a description of one embodiment of the present invention. The tongue plate 2 may be provided with a guide roller which can be set in accordance with the direction of the seat belt drawn out long, instead of the slot 3.

Instead of the belt retractors 9, 11 eccentric rollers or grooved rollers can be used which are capable of stopping the drawing-out of the seat belt when an impact of a sudden tensile force is applied. One of the belt retractors 9, 11 may be omitted, and the corresponding end portion of the seat belt may be fixed.

In order that the motor 18, even if it is a miniaturized one, is slided, it has to be provided on the inner surface of the door. Accordingly, the motor 18 may be provided outside the guide rail 17 and the wheels 19 may be rollably provided on the guide buckle 20, drawing the guide buckle 20 by the motor with a circular wire like a winch. A hydraulic piston may be used instead of the electric motor so as to speed up the rolling of the wheels 19. It is necessary that the movement of the motor 18 be stopped automatically in the higher and lower positions 15, 16, i.e. the terminals of the guide rail 17 by limit switches (not shown).

The means for engaging the guide buckle 20 with the tongue plate 2 are not limited to the bore 23 and hook portion 24. These two parts 20 and 2 may be engaged by magnets one of which is positioned at its circumferential portion by a plate spring so as to prevent the magnet from slipping.

The number of the wheels 19 may be two or three, and the shafts may be parallel or vertical to the guide rail 17. The wheels 19 may be arranged so that the adjacent wheels can be spaced from each other to a full extent with respect to the width of the guide rail.

When the tongue plate 2 in the higher position 15 is drawn toward the lower position 16, it disengages from the guide buckle 20, so that the tension of the seat belt 1 is relieved. Consequently, the seat belt can be set manually in the same manner as that of conventional seat belts. The anchor buckle 25 also is preferably so made that it can be disengaged manually when the bar 32 is pushed to cause the gear 31 to become loose and to be operative.

Since the seat belt according to the present invention has the above-described structure, when a person gets on and off the automobile, the seat belt extends from the front portion of the door and is in the free state, so that the seat belt does not obstruct the person to get on the automobile. The restraint of the person can be done by completely automatic operation with only one simple operation, and the wearing of the seat belt is always carried out.

The restraint state of the seat belt can be maintained even while the door is opened, as long as the guide buckle is engaged with the anchor buckle. When the door is opened, the person may be returned to the free state, or the anchor buckle may be disengaged.

The automatic seat belt according to the present invention is made so that both the shoulder belt and lap belt can be incorporated perfectly thereinto.

The present invention is not, obviously, limited to the above embodiment; it may be modified in various ways within the scope of the appended claims.

What is claimed is:

1. An automatic restraint system for use in a vehicle, comprising:
   a tongue plate;
   a first seat belt having two ends, said first seat belt being connected at one of said ends thereof to said tongue plate;
   a second seat belt having two ends, said second seal belt being connected at one of said ends thereof to said tongue plate;

an anchor buckle for receiving and releasably latching said tongue plate;

a first belt retractor disposed at a rear lower portion of an inner side of a seat bottom, for winding and unwinding of said first seat belt;

a second belt retractor disposed at a rear lower portion of an inner side of a seat back, for winding and unwinding of said second seat belt;

one of said first and second seat belts being wound in said first belt retractor for use as a lap seat belt, the other one of said first and second seat belts is wound in said second belt retractor for use as a shoulder belt;

a guide rail fixedly mounted on an inner surface of a door of the vehicle;

a guide buckle slidably engaged with said guide rail, said guide rail diagonally disposed on the inner surface of the vehicle door such that a front end of said guide rail is higher than a rear end of said guide rail, in a free condition said guide buckle being retained in a highest position of said guide rail adjacent said front end of said guide rail when the vehicle door is open so as to allow a passenger to get into or out of the vehicle, and in a restraining position said guide buckle being at the lowest position of said guide rail adjacent said rear end of said rail so as to restrain the person when the vehicle door is closed.

2. An automatic seat belt according to claim 1, further comprising another anchor buckle disposed on a rear lower portion of said seat adjacent said rear end of said guide rail, wherein said tongue plate is also engageable with said another anchor buckle, and wherein during a transition between said free condition and said restraining condition, said tongue plate is transferred from said guide buckle engaged with said guide rail to said another anchor buckle on said seat to engage said another anchor buckle.

* * * * *